June 9, 1931.  W. T. BALLOU  1,809,228
COMMUTATOR MICA UNDERCUTTING TOOL
Filed Oct. 30, 1929

Inventor
Walter T. Ballou
by Hazard & Miller
Attorneys

Patented June 9, 1931

1,809,228

UNITED STATES PATENT OFFICE

WALTER T. BALLOU, OF LOS ANGELES, CALIFORNIA

COMMUTATOR MICA UNDERCUTTING TOOL

Application filed October 30, 1929. Serial No. 403,557.

This invention relates to a tool primarily designed to undercut the insulation between the segments of a commutator, such as is employed on generators and the like.

An object of the invention is to provide a tool which presents a saw toothed edge and which can be easily manipulated to cut back the insulation, which is usually formed of mica, disposed between the commutator segments. By virtue of the fact that the insulation does not wear as readily as the copper used in the segments, the copper wears away somewhat faster, leaving the edges of the insulation projecting outwardly beyond the segments, consequently the brushes are not allowed to remain in continual contact with the segments as is desired.

Heretofore in accomplishing this work it has been customary to use a broken hack saw blade to cut back the insulation. Such hack saw blades are difficult to handle and not properly shaped to enable the insulation to be cut back with the greatest ease and efficiency. It is, therefore, another object of the invention to provide a commutator mica undercutting tool in which the teeth on the blade are so arranged as to enable the mica to be cut back with the greatest amount of ease and efficiency.

Another object of the invention is to provide a commutator mica undercutting tool having a handle, a saw toothed blade on the handle, and a guide for the blade which will tend to guide the movements of the blade in cutting back the mica insulation.

With the foregoing and other objects in view, which will be made manifest in the following detailed description, and specifically pointed out in the appended claims, reference is had to the accompanying drawings for an illustrative embodiment of the invention, wherein:

Figure 1:
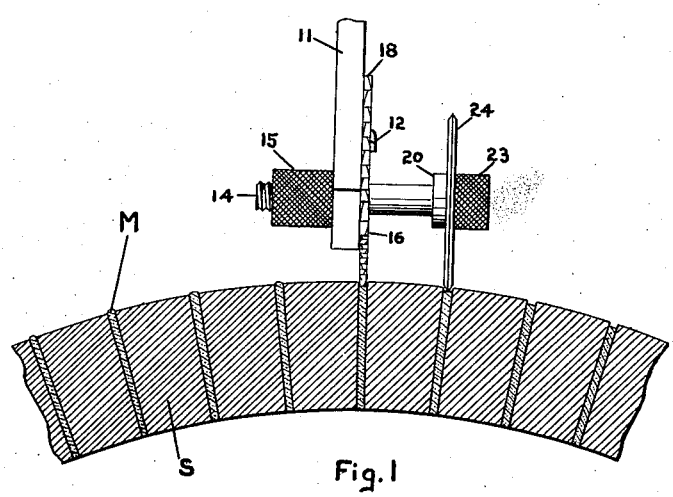
Fig. 1 is a partial view in vertical section through a commutator illustrating the manner in which the improved tool is used in cutting back the mica insulation.
Figure 2:
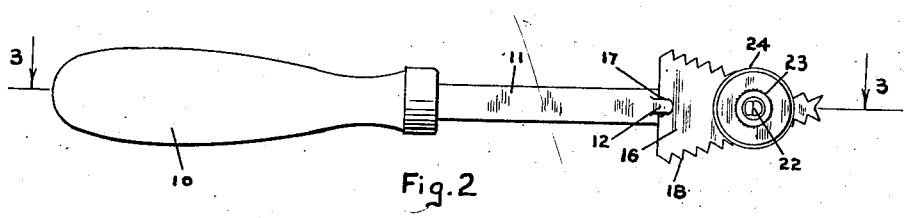
Fig. 2 is a view in side elevation of the improved tool.
Figure 3:
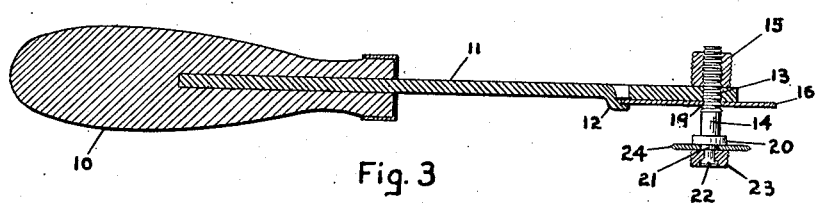
Fig. 3 is a horizontal section taken substantially upon the line 3—3 upon Fig. 2.

Referring to the accompanying drawings, wherein similar reference characters designate similar parts throughout, the improved commutator mica undercutting tool comprises a handle 10, which is mounted on a shank 11. Near the end of the shank a small lip is struck out of the shank on one side thereof, as indicated at 12, which lip projects toward the free end of the shank 11. At the end of the shank there is formed a transverse aperture 13 which is internally threaded to receive a screw 14. A knurled jamb nut 15 is also threaded onto the screw and is adapted to be tightened against one side of the shank so that although the screw 14 can be adjusted laterally with respect to the shank by rotating it, it may be held in adjusted position by tightening the knurled jamb nut 15 against the side of the shank. A blade 16 is provided, illustrated as being somewhat triangular in form. In its rear edge the blade is provided with a notch 17 adapted to receive the struck out lip 12. The converging sides of the blade are provided with saw teeth 18 and, as clearly shown in Fig. 2, these toothed sides meet each other at the outer end of the blade so that the blade is quite pointed. Near the outer end of the blade there is formed an aperture 19 which receives the screw 14.

The outer end of the screw has a large shoulder 20 formed thereon, adjacent which there is a small shoulder 21, from which projects a stem 22. A knurled cap 23 is provided, which has an internal annular shoulder capable of being slipped onto the stem 22 and, after having been positioned thereon, the stem is split or riveted over so as to permanently mount the cap on the screw. Before the cap is slipped on, however, a guide roller or guide wheel 24 is positioned on the small shoulder 21 so that the guide roller or guide wheel may rotate thereon between the cap 23 and the large shoulder 20. Adjustment of the screw 14, when the jamb nut 15 has been loosened, varies the position of the guide roller 24 with respect to the blade 16.

The operation and advantages of the improved tool are as follows. As previously explained, the copper commutator segments, indicated at S, wear somewhat faster than the mica insulation M so that in the course of time the edges of the insulation project slightly above the tops of the segments S. In using the tool the blade is reciprocated by means of the handle 10, the work usually being started near the end or corner of the insulation. By reciprocating the blade it will be caused to saw back the projecting insulation and after the blade becomes started the handle may be lifted so that the bottom edge of the blade will be parallel to the edge of the mica insulation. In starting the work it will be understood that if the top edge of the insulation is horizontal, that the handle and shank will be reciprocated horizontally, causing the inclined toothed edge to cut away the corner only. After the corner has been cut away, the handle is lifted so that the toothed edge of the blade is horizontal and thus causing it to saw along the entire length of the edge of the insulation. The sawing back of the first insulation is usually the hardest because the insulation projects above the copper segments and the blade has a tendency to slip off of it. After the first section of insulation has been cut back, however, the guide wheel or guide roller can be used and will facilitate cutting back the remaining insulation segments. When the first insulation segment has been cut back, the screw 14 is adjusted so that the guide roller 24 is spaced from the blade equal to the distance between a commutator segment. In cutting back subsequent insulation segments the guide roller is positioned in the shallow groove formed by cutting back the initial insulation segment and in reciprocating the handle and blade the guide roller will keep the blade directly over the edge of the adjacent insulation segment, thus overcoming the tendency of the blade to slip off of the projecting edge of insulation. This process of utilizing the grooves formed by already cut back insulation to guide the movements of the blade in cutting the remainder insulation segments is continued until all of the insulation segments have been cut back to a point slightly beneath the top surfaces of the commutator segments S.

If the blade should become dull or broken, it may be easily replaced by loosening the jamb nut 15, unscrewing the screw 14, and slipping the blade out from beneath the lip 12 and applying a new blade in the reverse manner.

From the above described construction it will be appreciated that the improved tool is of cheap, simple and durable construction, yet it facilitates the cutting back of the mica insulation between commutator segments with great ease and a maximum efficiency.

Various changes may be made in the details of construction without departing from the spirit or scope of the invention as defined by the appended claims.

I claim:

1. A mica undercutting tool comprising a shank, means providing a lip on the shank, a blade presenting saw teeth positioned on the shank having a notch adapted to receive the lip, and additional means for fastening the blade to the shank, said additional means providing guide means in spaced parallel relation to the blade.

2. A mica undercutting tool comprising a shank, means providing a toothed edge on the shank, a screw adjustable on the shank, and a guide roller rotatable on the screw and disposed in parallel relation to the edge.

3. A mica undercutting tool comprising a shank, a handle on the shank, a blade on the shank presenting a toothed edge inclined to the longitudinal axis of the blade, a screw threaded through the blade and shank, and a roller rotatable on the screw and arranged parallel to the blade.

4. A mica undercutting tool comprising a shank, a handle on the shank, a blade on the shank presenting a toothed edge inclined to the longitudinal axis of the blade, a screw threaded through the blade and shank, a roller rotatable on the screw and arranged parallel to the blade, said screw being capable of being adjusted so as to vary the position of the roller with respect to the blade, and a jamb nut for holding the screw in adjusted position.

5. A mica undercutting tool comprising a shank, means providing a lip on the shank, a blade positioned on the shank and presenting saw teeth on an edge inclined to the longitudinal axis of the shank, said blade having a notch adapted to receive the lip, and additional means for fastening the blade to the end of the shank.

In testimony whereof I have signed my name to this specification.

WALTER T. BALLOU.